(12) United States Patent
Hosea et al.

(10) Patent No.: US 8,108,245 B1
(45) Date of Patent: Jan. 31, 2012

(54) METHOD AND SYSTEM FOR WEB USER PROFILING AND SELECTIVE CONTENT DELIVERY

(75) Inventors: Devin F. Hosea, Boston, MA (US); Arthur P. Rascon, Lexington, MA (US); Richard S. Zimmerman, Belmont, MA (US); Anthony Scott Oddo, Jamaica Plain, MA (US); Nathaniel Thurston, Somerville, MA (US)

(73) Assignee: Cox Communications, Inc., Atlanta, GA (US)

( * ) Notice: Subject to any disclaimer, the term of this patent is extended or adjusted under 35 U.S.C. 154(b) by 868 days.

(21) Appl. No.: 09/558,755

(22) Filed: Apr. 21, 2000

Related U.S. Application Data

(60) Provisional application No. 60/154,640, filed on Sep. 17, 1999.

(51) Int. Cl.
*G06Q 10/00* (2006.01)
*G06Q 30/00* (2006.01)

(52) U.S. Cl. .................. 705/7.33; 705/7.29; 705/14.49; 705/14.53

(58) Field of Classification Search ................. 705/7.33, 705/10
See application file for complete search history.

(56) References Cited

U.S. PATENT DOCUMENTS

| | | | |
|---|---|---|---|
| 5,223,924 A | 6/1993 | Strubbe | |
| 5,347,632 A | 9/1994 | Filepp et al. | 395/200 |
| 5,572,643 A | 11/1996 | Judson | 395/793 |
| 5,592,551 A | 1/1997 | Lett et al. | |
| 5,659,350 A | 8/1997 | Hendricks et al. | |
| 5,710,884 A * | 1/1998 | Dedrick | 709/217 |
| 5,740,252 A * | 4/1998 | Minor et al. | 713/153 |
| 5,740,549 A | 4/1998 | Reilly et al. | 705/14 |
| 5,754,774 A | 5/1998 | Bittinger et al. | 395/200.33 |
| 5,761,662 A | 6/1998 | Dasan | 707/10 |
| 5,794,210 A | 8/1998 | Goldhaber et al. | 705/14 |
| 5,798,785 A | 8/1998 | Hendricks et al. | |
| 5,801,747 A | 9/1998 | Bedard | |
| 5,812,784 A | 9/1998 | Watson et al. | 395/200.57 |
| 5,848,396 A * | 12/1998 | Gerace | 705/1 |
| 5,848,397 A | 12/1998 | Marsh et al. | |
| 5,913,040 A | 6/1999 | Rakavy et al. | 395/200.62 |

(Continued)

FOREIGN PATENT DOCUMENTS

WO    WO 00/33233    6/2000

(Continued)

OTHER PUBLICATIONS

Kannan, P.K., Chang, Ai-Mei, and Whinston, Andrew B., Marketing Information on the I-Way, Mar. 1998, Communications of the ACM, vol. 41 No. 3, pp. 35-43.*

(Continued)

*Primary Examiner* — Andre Boyce
(74) *Attorney, Agent, or Firm* — Merchant & Gould

(57) ABSTRACT

A method and system are provided for accurately and anonymously profiling Web users and for selectively delivering content such as advertisements to users based on their profiles. The system uses behavioral information preferably collected at the users' point of connection to the Internet to anonymously profile their interests and demographics. It accurately matches and delivers content to the users to which they will likely be most receptive. Advertisers can use the system to launch effective advertising campaigns delivering selected Web content to chosen target audiences. The system uses feedback from users to determine the effectiveness of an advertising campaign and allows dynamic modification of the advertising campaign by, e.g., altering the target audience, to optimize results.

32 Claims, 7 Drawing Sheets

U.S. PATENT DOCUMENTS

| | | | |
|---|---|---|---|
| 5,945,988 A | 8/1999 | Williams et al. | |
| 5,946,646 A | 8/1999 | Schena et al. | 702/177 |
| 5,948,061 A | 9/1999 | Merriman et al. | |
| 5,959,623 A | 9/1999 | van Hoff et al. | 345/333 |
| 5,966,695 A * | 10/1999 | Melchione et al. | 705/10 |
| 5,974,398 A * | 10/1999 | Hanson et al. | 379/88.2 |
| 6,005,597 A | 12/1999 | Barrett et al. | |
| 6,012,051 A | 1/2000 | Sammon, Jr. et al. | 706/52 |
| 6,014,638 A | 1/2000 | Burge et al. | 705/27 |
| 6,014,654 A | 1/2000 | Ariyoshi | |
| 6,018,372 A | 1/2000 | Etheredge | |
| 6,026,368 A | 2/2000 | Brown et al. | 705/14 |
| 6,041,311 A | 3/2000 | Chislenko et al. | |
| 6,049,777 A | 4/2000 | Sheena et al. | 705/10 |
| 6,064,980 A | 5/2000 | Jacobi et al. | |
| 6,078,866 A * | 6/2000 | Buck et al. | 702/2 |
| 6,088,722 A | 7/2000 | Herz et al. | |
| 6,092,049 A | 7/2000 | Chislenko et al. | |
| 6,112,192 A | 8/2000 | Capek | |
| 6,119,101 A | 9/2000 | Peckover | |
| 6,134,532 A | 10/2000 | Lazarus et al. | 705/14 |
| 6,144,944 A | 11/2000 | Kurtzman, II et al. | |
| 6,157,946 A | 12/2000 | Itakura et al. | 709/217 |
| 6,163,316 A | 12/2000 | Killian | 345/327 |
| 6,177,931 B1 | 1/2001 | Alexander et al. | 345/327 |
| 6,208,975 B1 * | 3/2001 | Bull et al. | 705/14 |
| 6,236,975 B1 * | 5/2001 | Boe et al. | 705/10 |
| 6,236,978 B1 | 5/2001 | Tuzhilin | 705/26 |
| 6,243,760 B1 * | 6/2001 | Armbruster et al. | 709/243 |
| 6,285,983 B1 * | 9/2001 | Jenkins | 705/10 |
| 6,285,987 B1 * | 9/2001 | Roth et al. | 705/14 |
| 6,295,061 B1 * | 9/2001 | Park et al. | 345/764 |
| 6,298,348 B1 * | 10/2001 | Eldering | 705/10 |
| 6,305,017 B1 | 10/2001 | Satterfield | |
| 6,311,211 B1 * | 10/2001 | Shaw et al. | 709/206 |
| 6,327,574 B1 * | 12/2001 | Kramer et al. | 705/10 |
| 6,334,110 B1 * | 12/2001 | Walter et al. | 705/14 |
| 6,366,298 B1 | 4/2002 | Haitsuka et al. | |
| 6,385,590 B1 | 5/2002 | Levine | |
| 6,427,063 B1 | 7/2002 | Cook et al. | |
| 6,449,632 B1 * | 9/2002 | David et al. | 709/202 |
| 6,460,036 B1 | 10/2002 | Herz | 707/748 |
| 6,708,335 B1 | 3/2004 | Ozer et al. | |
| 6,757,691 B1 | 6/2004 | Welsh et al. | |
| 6,766,525 B1 | 7/2004 | Lee et al. | 725/46 |
| 6,769,009 B1 * | 7/2004 | Reisman | 709/201 |
| 6,845,102 B1 * | 1/2005 | Bendelac et al. | 370/401 |
| 6,882,977 B1 | 4/2005 | Miller | |
| 6,882,990 B1 | 4/2005 | Barnhill et al. | |
| 6,889,218 B1 | 5/2005 | Nassehi | |
| 6,898,762 B2 | 5/2005 | Ellis et al. | 715/716 |
| 7,003,792 B1 | 2/2006 | Yuen | |
| 7,013,478 B1 | 3/2006 | Hendricks et al. | 725/46 |
| 7,020,643 B2 | 3/2006 | Mah et al. | |
| 7,092,926 B2 | 8/2006 | Cerrato | |
| 7,328,216 B2 | 2/2008 | Hofmann et al. | |
| 7,496,553 B2 | 2/2009 | Cerrato | |
| 2001/0011264 A1 * | 8/2001 | Kawasaki | 707/1 |
| 2001/0049620 A1 | 12/2001 | Blasko | |
| 2001/0056370 A1 | 12/2001 | Tafla | |
| 2002/0004744 A1 | 1/2002 | Muyres et al. | |
| 2002/0013729 A1 | 1/2002 | Kida | |
| 2002/0059094 A1 | 5/2002 | Hosea et al. | |
| 2002/0129368 A1 | 9/2002 | Schlack et al. | |
| 2005/0028208 A1 | 2/2005 | Ellis et al. | |
| 2007/0011039 A1 | 1/2007 | Oddo | |

FOREIGN PATENT DOCUMENTS

| | | |
|---|---|---|
| WO | WO 00/49801 | 8/2000 |
| WO | WO 01/20481 A2 | 3/2001 |
| WO | WO 02/082214 A2 | 10/2002 |
| WO | WO 02/102030 A2 | 12/2002 |

OTHER PUBLICATIONS

"AdForce and Activate Deliver Next Generation Web Advertising" Business Wire, Nov. 8, 2000.

"CacheFlow Delivers cIQ Content-Smart Delivery Architecture," *Business Wire*, downloaded from Proquest http://proquest.umi.com/pqdweb?index=37&did=000000068530970 &SrchMode=1&sid=5, 5 pages (Feb. 12, 2001).

European Search Report cited in Application No. 04758240.8 mailed Mar. 6, 2006.

Frook, J., "Web Add-On Helps Identify Site Visitors," *CommunicationsWeek*, downloaded from Proquest http://proquest.umi.com/pqdqeb?indez=9&did= 000000010792847&sRCHmODE=1&SID=3&, 2 pages (Oct. 30, 1995).

International Search Report cited in Application No. PCT/US04/08924 mailed Dec. 28, 2004.

Office Action mailed Dec. 16, 2004, in co-pending U.S. Appl. No. 09/877,974.

Office Action mailed Aug. 11, 2005, in co-pending U.S. Appl. No. 09/877,974.

Office Action mailed Jan. 24, 2006, in co-pending U.S. Appl. No. 09/877,974.

Miscellaneous Action mailed Aug. 10, 2006, co-pending U.S. Appl. No. 09/877,974.

Office Action mailed Dec. 1, 2006, in co-pending U.S. Appl. No. 09/877,974.

Advisory Action mailed Feb. 26, 2007, in co-pending U.S. Appl. No. 09/877,974.

Office Action mailed May 17, 2007, in co-pending U.S. Appl. No. 09/877,974.

Office Action mailed Oct. 31, 2007, in co-pending U.S. Appl. No. 09/877,974.

Advisory Action mailed Jan. 14, 2008, in co-pending U.S. Appl. No. 09/877,974.

Office Action mailed Apr. 3, 2008, in co-pending U.S. Appl. No. 09/877,974.

Office Action mailed Oct. 22, 2008, in co-pending U.S. Appl. No. 09/877,974.

Advisory Action mailed Feb. 4, 2009, in co-pending U.S. Appl. No. 09/877,974.

Office Action mailed May 15, 2009, in co-pending U.S. Appl. No. 09/877,974.

Office Action mailed Jan. 13, 2010, in co-pending U.S. Appl. No. 09/877,794.

Advisory Action mailed Jul. 14, 2010, in co-pending U.S. Appl. No. 09/877,974.

Office Action mailed Sep. 14, 2010, in co-pending U.S. Appl. No. 09/877,974.

Office Action mailed Mar. 24, 2010, in pending U.S. Appl. No. 10/551,102.

Office Action mailed Sep. 28, 2010, in pending U.S. Appl. No. 10/551,102.

Harvey, Bill. "*Better Television audience Measurement through the research integration of set-top box data*". Phase Two, Copyright by ESOMAR®/ARF, published date unknown, 20 pages.

Bloedorn, Eric; Mani, Inderjeet. "*Using NLP for Machine Learning of User Profiles*". Artificial Intelligence Technical Center, the MITRE Corporation. 1998. 18 pages.

Good, Nathaniel; Schafer, J. Ben; Konstan, Joseph A.; Borchers, Al; Sarwar, Badrul; Herlocker, Jon; and Riedl, John. "*Combing Collaborative Filtering with Personal Agents for Better Recommendation*". GroupLens Research Project. Dept. of Computer Science and Engineering, University of Minnesota. 1999. 8 pages.

Balabanovic, Mark. "*An Adaptive Web Page Recommendation Service*". Department of Computer Science, Stanford University. 1997. 8 pages.

Pazzani, Michael J. "*Framework for Collaborative, Content-Based and Demographic Filtering*". Department of Information and Computer Science University of California, Irvine. 1999. 16 pages.

Notice of Allowance mailed Feb. 22, 2011, in pending U.S. Appl. No. 09/877,974.

Office Action mailed Mar. 21, 2011, in pending U.S. Appl. No. 10/551,102.

Notice of Allowance mailed Jul. 22, 2011, in pending U.S. Appl. No. 10/551,102.

\* cited by examiner

METHOD AND SYSTEM FOR WEB USER PROFILING AND SELECTIVE CONTENT DELIVERY

RELATED APPLICATION

The present application claims priority on Provisional Application Ser. No. 60/154,640 filed on Sep. 17, 1999 and entitled "Method and Apparatus for Predictive Marketing."

BACKGROUND OF THE INVENTION

1. Field of the Invention

The present invention relates generally to methods of profiling Web users and for delivering targeted content to users.

2. Description of Related Art

Web advertising (typically banner advertisements) directed to Web users is expected to grow rapidly along with the growth of the Internet and E-commerce activity. Traditional methods of Web advertising have been found to be generally ineffective in drawing responses from Web users. For example, research has shown that few online users regularly click through ordinary banner advertisements.

A more effective means of Web advertising is advertising targeted to particular Web users. For example, it is known to profile Web users by determining their demographics and interests, and to selectively transmit advertisements to only those users having particular profiles. Information on users can be obtained, e.g., from the users themselves through questionnaires. However, in these profiling methods, there is no assurance of user privacy or the accuracy of the profiling data. Also, there is no way of accurately matching the advertising to user profiles.

A need exists for a method and system for accurately and anonymously profiling Web users. A need also exists for a method and system for accurately matching users of given profiles to content to which they will likely be most receptive.

BRIEF SUMMARY OF THE INVENTION

The present invention is directed to a method and system for accurately and anonymously profiling Web users and for selectively delivering content such as advertisements to users based on their profiles. The system uses behavioral information preferably collected at the users' point of connection to the Internet to anonymously profile their interests and demographics. It accurately matches and delivers content to the users to which they will likely be most receptive. Advertisers can use the system to launch effective advertising campaigns delivering selected Web content to chosen target audiences. The system uses feedback from users to determine the effectiveness of an advertising campaign and allows dynamic modification of the advertising campaign by, e.g., altering the target audience, to optimize results.

These and other features and advantages of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

The present invention is directed to a method and system for profiling Web users or clients based on their surfing habits and for selectively delivering content, e.g., advertising, to the users based on their profiles.

Figure 1:
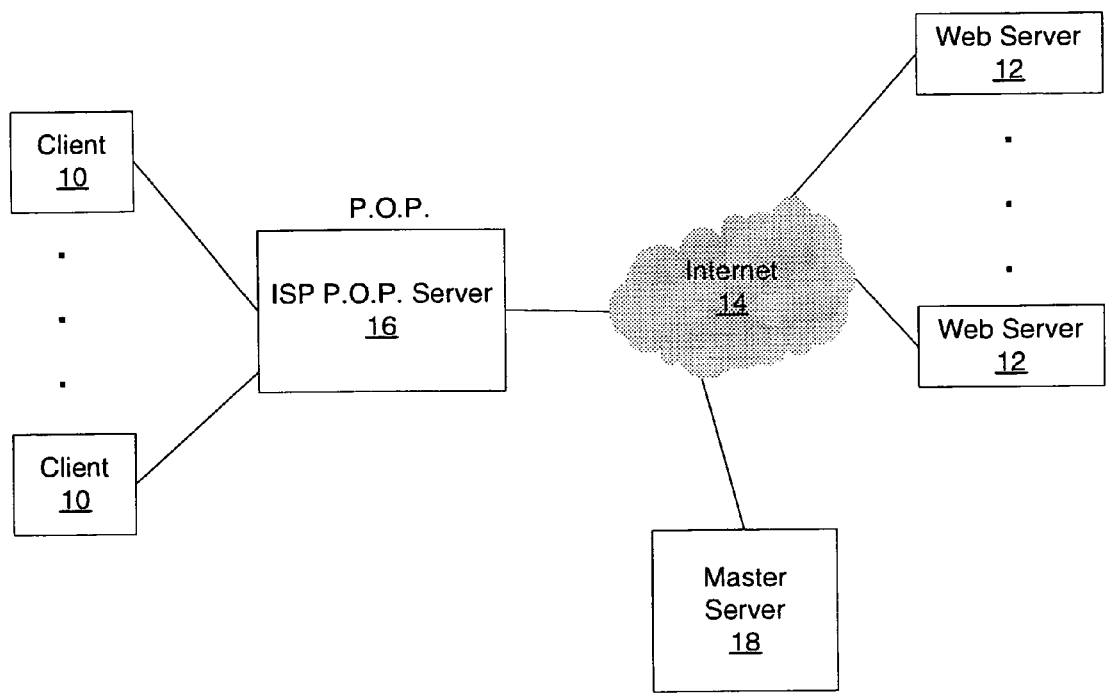
FIG. 1 is a block diagram illustrating of a representative network in which the inventive system is preferably implemented.

FIG. 1 illustrates a representative network in which the inventive system can be implemented. The network includes a plurality of client machines 10 operated by various individual users. The client machines 10 connect to multiple servers 12 via a communication channel 14, which is preferably the Internet. It may, however, alternatively comprise an Intranet or other known connections. In the case of the Internet, the servers 12 are Web servers that are selectively accessible by various clients. The Web servers 12 operate so-called "Web sites" and support files in the form of documents and pages. A network path to a Web site generated by the server is identified by a Uniform Resource Locator (URL).

One example of a client machine 10 is a personal computer such as a Pentium-based desktop or notebook computer running a Windows operating system. A representative computer includes a computer processing unit, memory, a keyboard, a mouse and a display unit. The screen of the display unit is used to present a graphical user interface (GUI) for the user. The GUI is supported by the operating system and allows the user to use a point and click method of input, e.g., by moving the mouse pointer on the display screen to an icon representing a data object at a particular location on the screen and pressing on the mouse buttons to perform a user command or selection. Also, one or more "windows" may be opened up on the screen independently or concurrently as desired.

Client machines 10 typically include browsers, which are known software tools used to access the servers 12 of the network. Representative browsers include, among others, Netscape Navigator and Microsoft Internet Explorer. Client machines 10 usually access servers 12 through some private Internet service provider (ISP) such as, e.g., America Online. Illustrated in FIG. 1 is the ISP "point-of-presence" (POP), which includes an ISP POP Server 16 linked to the client machines 10 for providing access to the Internet. The POP server 16 is connected to a section of the ISP POP local area network (LAN) that contains the user-to-Internet traffic. As will be discussed in detail below, the ISP POP server 16 captures URL page requests from individual client machines 10 for use in user profiling and also distributes targeted content to users. Also, as will be discussed in detail below, the inventive system also preferably includes a remote master server 18 linked to the ISP POP server 16 through the Internet. The system software is preferably distributed over the network at client machines 10, the ISP POP server 16, and the master server 18 as will be discussed below.

As is well known, the World Wide Web is the Internet's multimedia information retrieval system. In particular, it is a collection of servers of the Internet that use the Hypertext Transfer Protocol (HTTP), which provides users access to files (which can be in different formats such as text, graphics, images, sound, video, etc.) using, e.g., a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of a client machine having an HTML-compatible browser (e.g., Netscape Navigator) can retrieve a Web page (namely, an HTML formatted document) of a Web site by specifying a link via the URL [(e.g., www.yahoo.com/photography)]. Upon such specification, the client machine makes a transmission control protocol/Internet protocol (TCP/IP) request to the server identified in the link and receives the Web page in return.

Figure 2:
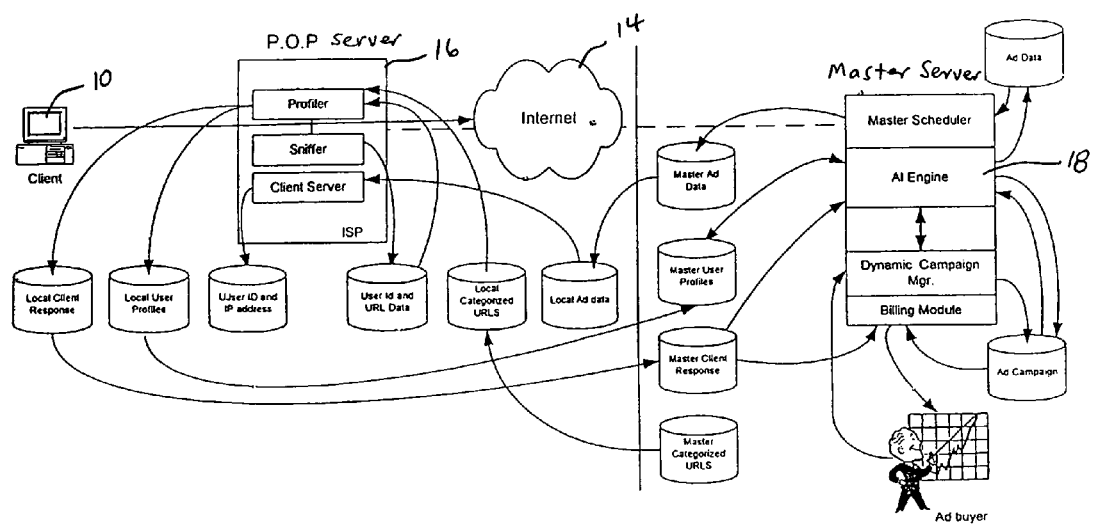
FIG. 2 is a block diagram illustrating the preferred overall architecture of the inventive system.

The inventive system profiles Web users based on their surfing habits and also selectively and intelligently delivers content such as advertising to users based on their profiles. FIG. 2 is a general overview of a preferred system architecture illustrating the interaction of the various system components. For convenience of illustration, selected components of the system are described below with respect to FIGS. 3-5 and 7-11.

Figure 3:
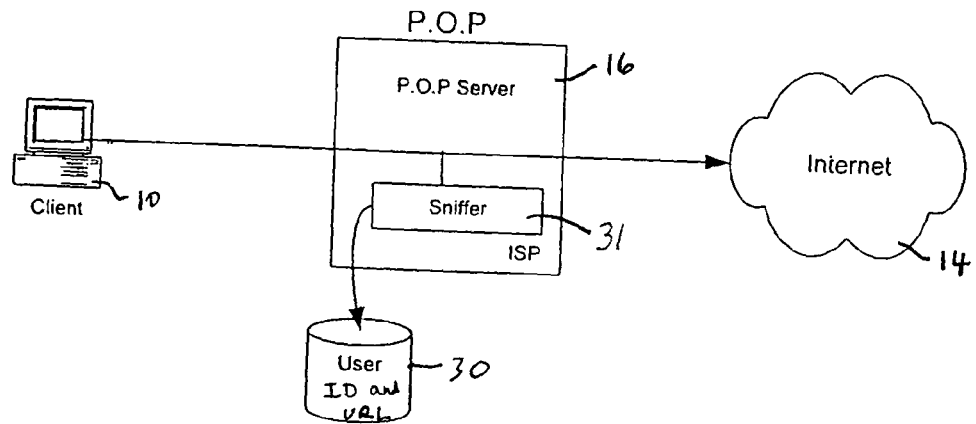
FIG. 3 is a block diagram illustrating the data collection component of the inventive system.

FIG. 3 illustrates the data collection component of the system, which resides at the POP server 16 and gathers data used in user profiling. The data collection component captures URL requests from clients, associates the requests with particular clients, and stores the data in a database (the UserID and URL database 30). The data collection component includes a sniffer 31 that monitors user-to-Internet traffic. When the sniffer 31 detects an outgoing Web page request from a client 10, it captures the associated packets, extracts the actual URL request, and stores it in the database 30 along with the client's IP address. Because IP addresses are typically assigned dynamically, they are not necessarily the same every time a client logs into the ISP. To correlate an IP address with the associated client, the data collection component queries an IP address to anonymous user ID (AID) cross-reference table stored in another database at the ISP POP. It then stores the User ID and URL information in the database 30.

Figure 4:
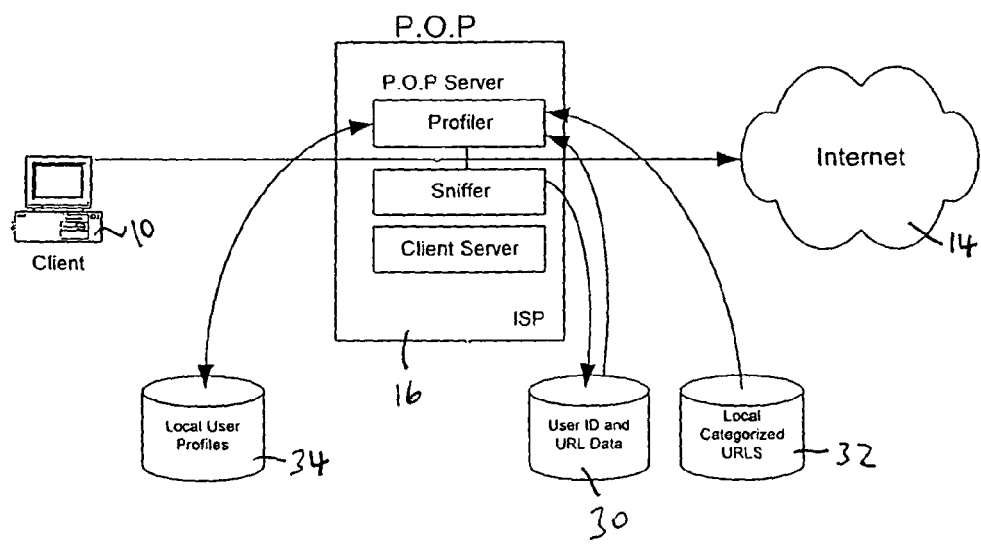
FIG. 4 is a block diagram illustrating the client profiling component of the inventive system.

FIG. 4 illustrates the client profiling component of the inventive system, which extracts, derives and updates individual user (i.e., client) profiles based on their behavior on the Internet as indicated by the data found in the browsed URL database (i.e., the UserID and URL database 30). User profile information may contain, but is not limited to, demographic data (such as, e.g., the user's age, gender, income, and highest attained education level) and psychographic data, which reflects the user's interests or content affinity (such as, e.g., sports, movies, music, travel, and finance). The client profiling component first extracts data stored in the User ID and URL database 30. Next, it cross-references the URL strings with data in a local categorized URL database 32, which contains demographic information on a large number of Internet URLs available from entities such as Nielsen (through a service called Nielsen NetRatings) that profile Web sites using panels of users having known demographic characteristics. The client profiling component extracts a set of demographic data associated with a particular Web site URL from the database 32. The profiling component also extracts content affinity or psychographic data from a categorized listing of URLs that translate an address into a content preference for the profile also from database 32.

Next, an existing user profile is pulled from a user profile database 34. Then, using a hybrid averaging algorithm, the URL demographic and content affinity data for URL requests made by a user and the user profile are combined to create an updated inferred user profile. One example of such an algorithm is an algorithm that provides a weighted average of the existing user profile data and the data gathered in the current Web browsing session. For example, the new user profile data equals the existing user profile data multiplied by the number of prior user sessions plus the new user profile data gathered in the current session, all divided by the sum of the number of prior sessions plus one. This is represented in the following equation:

$$\text{new user profile} = (\text{existing user profile} \times \text{number of prior sessions} + \text{new user profile})/(\text{number of prior sessions} + 1).$$

This updated profile is stored back to the local user profile database 34. (If the user is new and no user profile exists, a profile is created using URL and content affinity data for URL requests made by the user.)

In addition to updating (or creating) the demographic and psychographic profile of the user, the client profiling component will preferably parse through requested URL strings to search for keywords (e.g., keywords that may have been entered into a particular search engine). If such key words are found, they are stored along with the user profile in the user profile database.

As previously discussed, Web site profiles available from, e.g., Neilsen NetRatings are stored in the local categorized URL database 32. These Web site profiles are classified along multiple psychographic and demographic categories. As an example, the following 84 psychographic and 37 demographic categories can be used:

Demographic Categories
   Gender:
   Male
   Female
   Age:
   0-11
   12-17
   18-20
   21-24
   25-34
   35-49
   50-54
   55-64
   65-99
   Income:
   0-24,999
   25,000-49,999

50,000-74,999
75,000-99,999
100,000-149,000
150,000 and up
Education:
Some High School
High School Graduate
Some College
Associates Degree
Bachelor's Degree
Post Graduate
Occupation:
Administrative or Clerical
Craftsman
Educators
Executive
Laborer
Homemaker
Military
Professional
Sales
Service
Student
Technical
Self-employed
Retired
Race:
Hispanic
Non-Hispanic
African American
Caucasian
Asian
Native American
Psychographic Categories
Travel:
Air
Car Rental
Lodging
Reservations
Maps
Finance/Investments:
Banking
Brokers
Quotes
Insurance
Mortgage
Sports:
Auto Racing
Baseball
Basketball
Fantasy Sports
Football
Hockey
Soccer
Golf
Tennis
Recreation & Hobbies:
Cycling
Golf
Hiking
Sailing
Snow Sports
Surfing
Tennis
Home & Garden
Pets
Genealogy
Photography
Games
Toys
Entertainment:
Movies/Film
Music
Theater
TV/Video
Sci-Fi
Humor
Games
Toys
Auto:
Trucks
SUV
Sports car
News and Information:
Magazines
Weather
Politics:
Democrat
Republican
E-shopping:
Groceries
Furniture
Auctions
Cards/Gifts
Apparel
Books
Music
TV/Video
Software
E-purchasing
Computers
Software
Science
Employment
Education
Health & Fitness
Medical
Pharmacy
Dating/Single
Advice
Beauty
Weddings
Maternity
Spirituality/Religion
Astrology
Discount
Luxury
Child
Teens
College Age
Over 18
Spanish Language For each visit to a Web site having a stored profile, the Web site profile is averaged or combined into the user's profile as previously discussed. The profiles include a rating in each category that reflects the interest in the category of persons who access the Web site.

Each rating is accompanied by a confidence measure, which is an estimate of the accuracy of the rating. The confidence number is determined by analyzing the Web site and rating it on the type and specificity of content, with narrower and more singular content providing a higher confidence number. When the confidence measure in a particular category is below a predetermined threshold, information from other user profiles is preferably used to provide a more accurate rating in a process referred to as "profile completion."

An example of a user's profile is shown below. The first number in each category indicates the rating for that category. The ratings number is a percentage of a maximum rating, representing the degree of the user's affinity to the category. In the example below, the ratings number ranges from 0 to 100 with higher numbers indicating greater affinity. The second number in each category (in parenthesis) represents the confidence level in the rating for that category.

| | | | User Profile | | | | | |
|---|---|---|---|---|---|---|---|---|
| User ID | Sports | Finance | Movies | Music | TV | ... | Health | Gardening |
| 1 | 10.0 (.75) | 25.0 (.15) | 0.0 (1.00) | 0.0 (.28) | 0.0 (1.00) | ... | 50.0 (.77) | 85.0 (.82) |

Suppose the confidence threshold is defined to be 0.50 such that confidence is insufficient in any rating that has a confidence measure less than 0.50. For the user profile in the example table shown above, there is insufficient confidence in the ratings for the finance and music categories. In this situation, the system examines profiles of users with similar profiles to improve the accuracy of the ratings in those categories with low confidence measures.

A clustering algorithm can be used to find profiles that are similar to the profile of the current user. In judging the similarity between profiles, the confidence measures are ignored and the profiles are treated as n dimensional ratings vectors. A simple clustering algorithm is used based on the distance between vectors wherein all users whose profiles are within a certain distance of the subject user profile are collected. Then, the weighted average of all of the profiles in the collection is calculated to get an ideal profile for comparing to the subject user profile. If the ideal profile has a rating for the category in question that has an acceptable confidence measure, then this rating (and the accompanying confidence measure) replaces the corresponding rating in the subject user profile. In this way, parts of the user profile that have low confidence ratings are "completed" or "filled-in." An example is shown below.

fidence measure for each user. These products are then added across users in each category. This sum is then divided by the sum of the confidence measures added across users in the category. In mathematical terms, $R_{ideal,j} = \Sigma R_{i,j} C_{i,j} / \Sigma C_{i,j}$, where $R_{ideal,j}$ is the rating for the ideal profile in category j, $R_{i,j}$ is the rating in category j for user i, $C_{i,j}$ is the confidence measure in category j for user i and the sum is taken over i as i ranges from 1 to n, which is 5 in this example.

The confidence measure for each category in the ideal profile is calculated by taking the average of the confidence measure across users in the same category, $C_{ideal,j} = \Sigma C_{i,j}/n$, where $C_{ideal,j}$ is the confidence measure for category j in the ideal profile, $C_{i,j}$ is the confidence measure in category j for user i, and the sum is taken over i as i ranges from 1 to n, which is 5 in this example.

The ideal profile is used to complete the subject user profile. In the example described above, there was insufficient confidence in the ratings for the user in the finance and music categories. Users having similar profile ratings to the user were found to have a finance category rating of 21.1 with a confidence measure of 0.62. Since the confidence threshold was defined to be 0.50, it is possible to use the ideal profile finance rating of 21.1 (0.62) to replace the user's finance category rating of 25 (0.15). Similarly, the music category rating for similar user profiles was found to have a rating of 9.4 with a confidence measure of 0.84. This is greater than the threshold and is used to complete the subject user profile. The music category computation illustrates how the system is able to advantageously infer that the user may have an interest in the category despite the fact that he or she has not visited any Web sites related to that category. The completed subject user profile now appears as follows:

Group similar profiles to generate an ideal profile to be used to complete the user's profile

| User ID | Profile |
|---|---|
| 1 | 10.0 (.89), 21.0 (.75), 0.0 (1.00), 17.0 (.74), 0.0 (1.00), ..., 52.0 (.64), 95.0 (.90) |
| 2 | 12.0 (.77), 5.0 (.15), 0.0 (1.00), 12.0 (.85), 0.0 (1.00), ..., 40.0 (.84), 90.0 (.75) |
| 3 | 11.0 (.81), 20.0 (.77), 0.0 (1.00), 0.0 (1.00), 0.0 (1.00), ..., 75.0 (.77), 81.0 (.73) |
| 4 | 10.0 (.56), 25.0 (.68), 4.0 (.27), 11.0 (.77), 0.0 (1.00), ..., 55.0 (.80), 85.0 (.85) |
| 5 | 12.0 (.75), 22.0 (.77), 0.0 (1.00), 10.0 (.83), 2.0 (.30), ..., 60.0 (.41), 80.0 (.45) |
| Ideal profile | 11.0 (.76), 21.1 (.62), 0.9 (.85), 9.4 (.84), 0.5 (.86), ..., 55.8 (.69), 87.1 (.74) |

In the example above, the ideal profile is calculated in the following manner. The rating for each category in the ideal profile is calculated by multiplying the rating times the con-

| | | | 'Completed' User Profile | | | | | |
|---|---|---|---|---|---|---|---|---|
| User ID | Sports | Finance | Movies | Music | TV | ... | Health | Gardening |
| 1 | 10.0 (.75) | 21.1 (.62) | 0.0 (1.00) | 9.4 (.84) | 0.0 (1.00) | ... | 50.0 (.77) | 85.0 (.82) |

In order to protect the privacy of users, the system does not keep data on which sites have been visited by users for any long term period. Once data in the User ID and URL database 30 has been used for updating a user profile, it is erased. Thereafter, it is not possible to match users with particular Web sites visited.

In accordance with the invention, the system selectively delivers content, e.g., advertising, to users based on profiles inferred in the manner described above. The system includes a direct client communication component preferably residing at the ISP POP server 16 and a URL display component preferably residing at the client machine 10.

Figure 5:
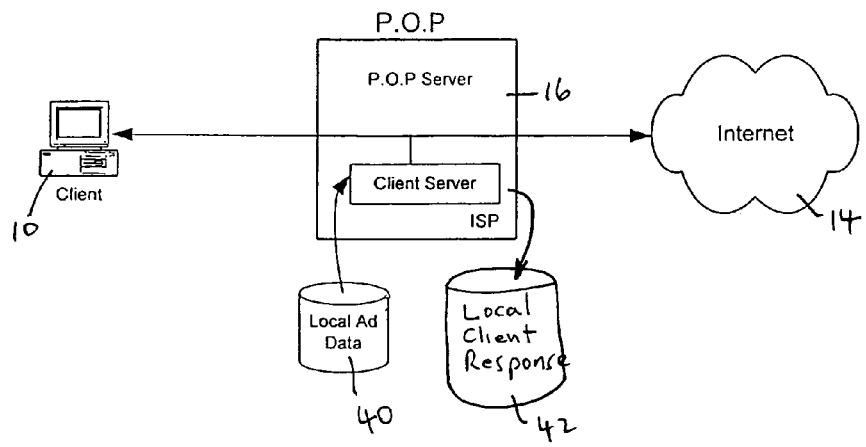
FIG. 5 is a block diagram illustrating the direct client communications component of the inventive system.

As illustrated in FIG. 5, the direct client communications component selectively retrieves selected content preferably in the form of URLs from a local advertisement database 40, and sends the it to client machines 10 using the ISP POP server 16. The content is displayed on the client machine 10 using the URL display component as will be described below.

The direct client communications associates a client's permanent anonymous user ID and the currently assigned IP address and stores the data in the IP address to AID cross-reference table.

The direct client communications component also optionally communicates to the ISP POP server 16 the details of a given client's computer configuration (e.g., which multimedia plug-ins are installed, the bandwidth of the Internet connection, etc.). This information can be used by the system to help ensure that rich-media content is delivered preferably only to those client machines that have the ability to easily and quickly display such content.

The direct client communications component also preferably communicates to the client machine the availability of any new versions of URL display software and indicates how they can be downloaded. The URL display component can then initiate an automated download/install process for the software update if desired by the user.

Figure 6:
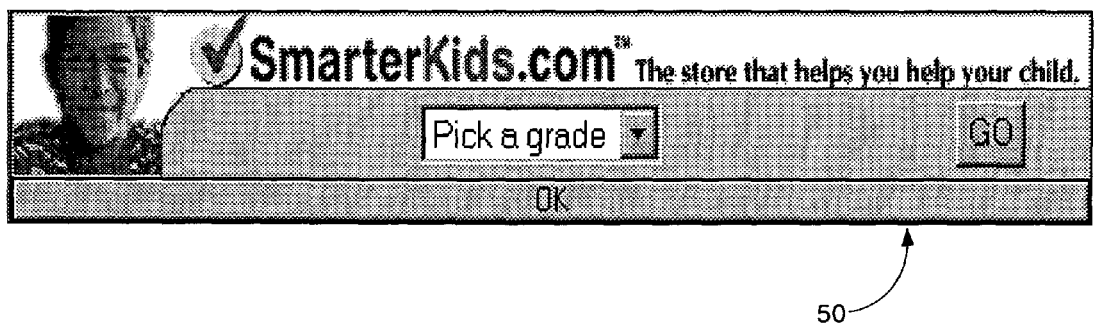
FIG. 6 is a screen shot of an exemplary pop-up advertisement in accordance with the invention.

The URL display component, which resides on individual client machines 10, periodically connects to the direct client communications component and downloads a list of URLs (linked to content such as advertisements) to be displayed on the client machines 10. The URL display component then uses the URLs to retrieve the actual content pointed to by the URL, and displays the content on the client machine display. The content is preferably displayed in a non-obtrusive manner. The content can, e.g., be displayed in a separate pop-up window. FIG. 6 is a screen shot 50 of a sample banner ad pop-up. The pop-up window preferably includes a "close" button, which allows a user to dismiss the window if desired. The window size, position, and order in the window stack are preferably remotely configurable. If the user clicks on the banner or some link therein (i.e., clicks-through), that destination is brought up in a browser window, and the user is transferred to the site of interest.

The URL display component records feedback information on the user's response to the delivered content. This data can include, e.g., how long the advertisement was displayed and whether there was a click-through. This data is sent to the direct client communications component, which stores it in a local client response database 42. This data can be used for billing advertisers and/or for advertising campaign result tracking will be discussed below.

Since the URL display component resides on the client machine, it is preferable that it make limited resource demands (e.g., on the client machine memory, CPU time and monitor space, Internet bandwidth, etc.). Accordingly, it is preferred that the URL display component monitors the Internet connection and only downloads the actual content data (pointed to by the URLs) when the connection is idle. Software updates are also preferably downloaded only when the connection is idle. Also, the URL display component preferably monitors the client machine CPU usage, the unused real estate on the display, the currently active application and any other relevant parameters to ensure that the content placement (i.e., the pop-up advertisement) and timing is both effective and not intrusive or annoying to the user. The URL display component also preferably monitors the versioning of the files required for software updates and downloads only the software files that have changed.

Figure 7:
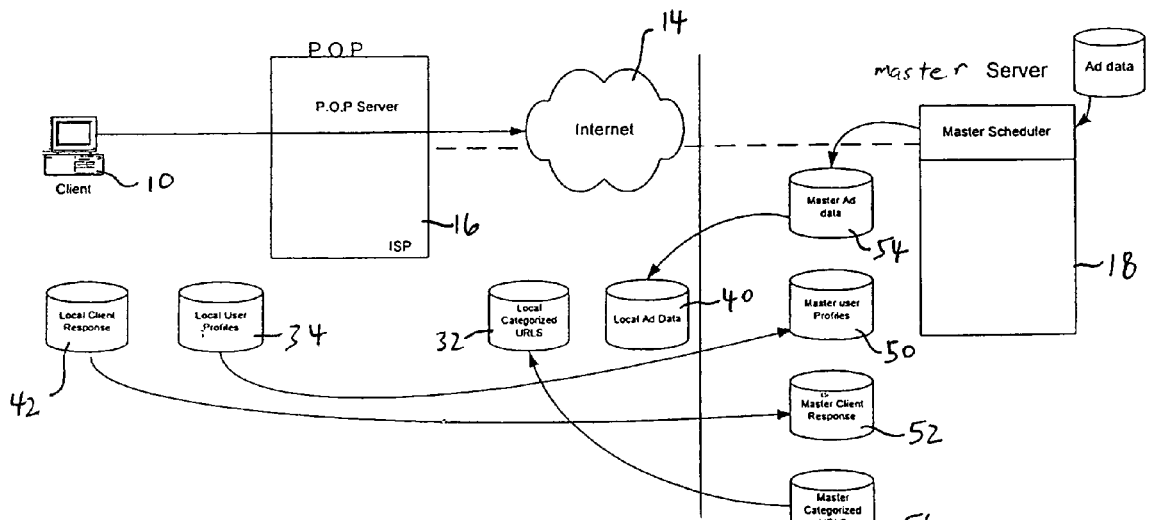
FIG. 7 is a block diagram illustrating the master server synchronization component of the inventive system.

The data collection, delivery and display components residing at the ISP POP server 16 and individual client machines 10 described above are preferably designed to operate "stand-alone," i.e., independently of and without interaction with the master server 18 for at least some period of time. The inventive system however preferably synchronizes data between the master server 18 and the POP server 16 from time to time as illustrated in FIG. 7. A master server synchronization component residing at the master server 18 and at the POP server 16 periodically retrieves the local client profile database 34 and integrates the data into the master client profile database 50 located at the master server 18. It also retrieves the local client response database 42 and integrates the data into the master client response database 52. The master server synchronization component also parses through a master advertisement delivery database 54 looking for anonymous user IDs that correspond to the local POP and creates the local advertisement delivery database 40 on the ISP POP. It also replicates a master categorized URL database 56 on the local categorized URL database 32.

This distributed architecture greatly reduces the bandwidth requirements of the individual ISP POP server 16 as well as the master server 18. In addition, it significantly enhances the scalability of the overall system. Also, it increases the fault tolerance of the overall system. Furthermore, is allows for rapid deployment, easy debug and monitoring, resulting in a very robust system.

Figure 8:
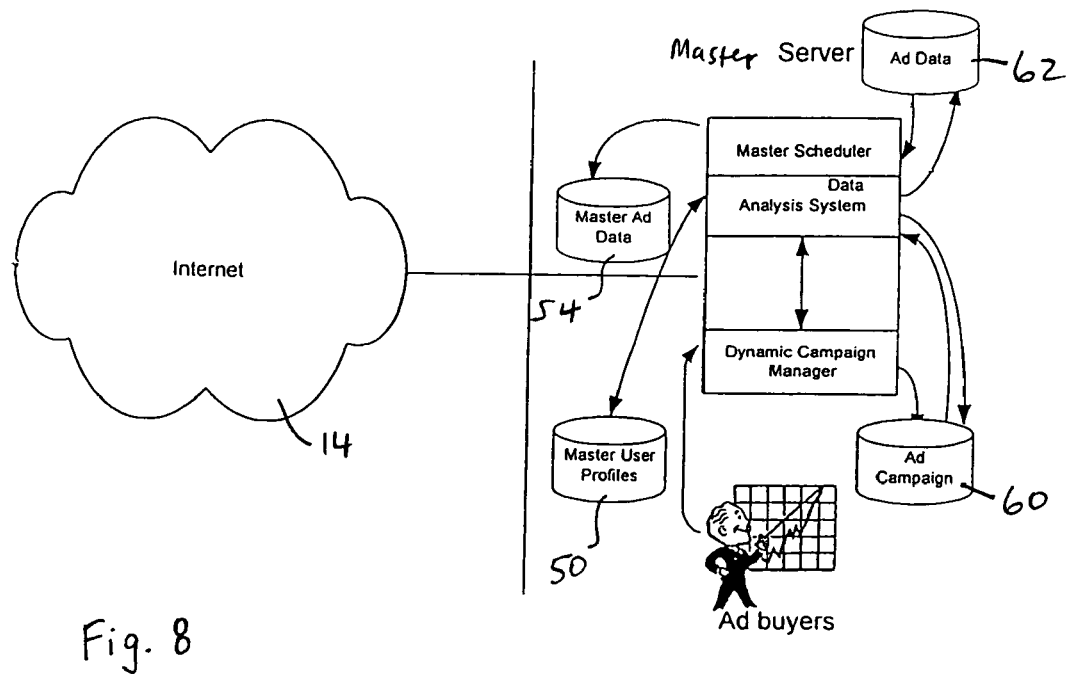
FIG. 8 is a block diagram illustrating the dynamic campaign manager of the inventive system.
Figure 9:
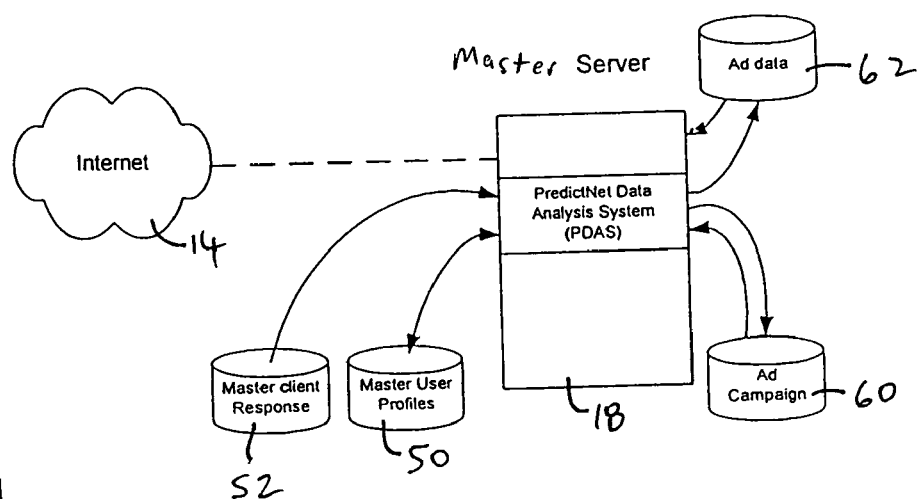
FIG. 9 is a block diagram illustrating the data analysis system component of the inventive system.

A dynamic campaign manager component shown in FIG. 8 resides on the master server 18 and provides a portal to the system for advertisers (i.e., ad buyers) to select a targeted audience for a particular advertising campaign. In choosing the target audience, the advertiser is given various options regarding the demographic and psychographic characteristics of the audience. The dynamic campaign manager component takes information entered by an advertiser and creates an advertisement profile and stores this data in an Ad Campaign database 60. This profile is used by a data analysis system component (shown in FIG. 10) to identify users who are most likely to respond to the content. The data analysis system takes advertising profile data from the ad campaign database 60 and matches it to user profiles from the master user profile database 50. (In addition, during the course of an advertising campaign, the data analysis system takes data from the master client response database 52 to refine the user profiles selection.) It writes results of match to the advertisement database 62. The master scheduler takes data from the advertisement database 62, resolves any conflicts, and writes to the master advertisement delivery database 54.

The advertiser can check on the success of a current campaign through the dynamic campaign manager. For example, the advertiser can monitor the number of times content has been delivered as well as the number of click-throughs on that content. The system is adaptive in that the advertiser preferably can, if desired, change its marketing strategy (e.g., by adjusting the profile of the targeted audience) at various points in the campaign to optimize results. Thus, campaigns can be altered dynamically based on changing requirements from the advertiser or feedback provided by the system.

Campaign management by an advertiser is preferably accomplished through a browser-based console. The advertiser can use it to define campaigns, provide content, and alter target groups. Feedback as to the success rate of their campaigns in progress is also accessible using the console.

Figure 10:
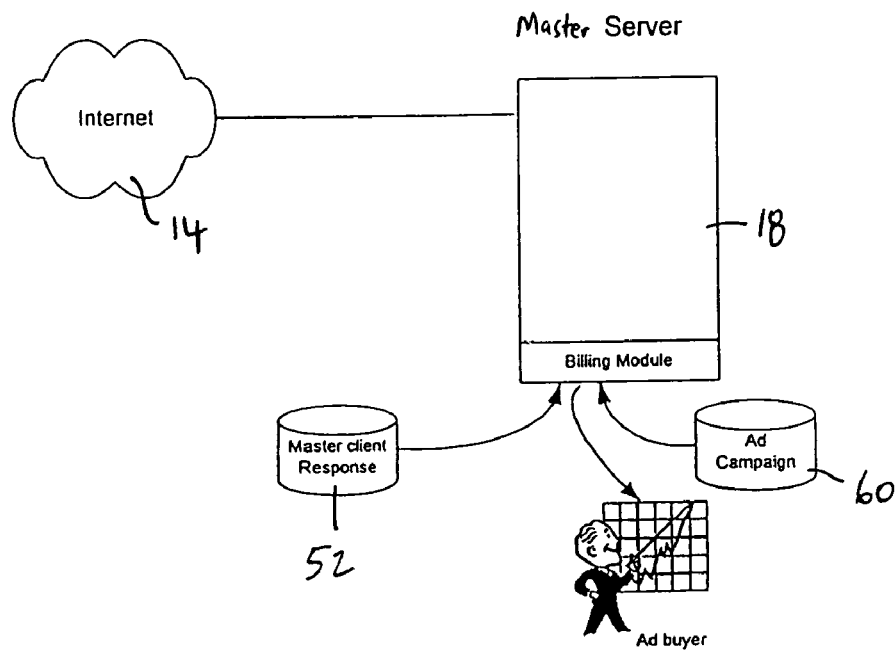
FIG. 10 is a block diagram illustrating the billing component of the inventive system.

FIG. 10 illustrates the billing component of the system. The billing component also preferably resides on the master server 18 and monitors the status of an advertising/content campaign, recognizes whether certain billing milestones have been met (e.g., whether an ad has been displayed a given number of times), and generates actual invoice information to be sent to advertisers. The billing component periodically queries the master client response database 52 to determine the current status of a particular campaign. If predefined billing milestones have been reached, the billing component retrieves specific customer (i.e., advertiser) information from the advertisement campaign database 60 to generate formatted invoices for billing purposes.

Figure 11:
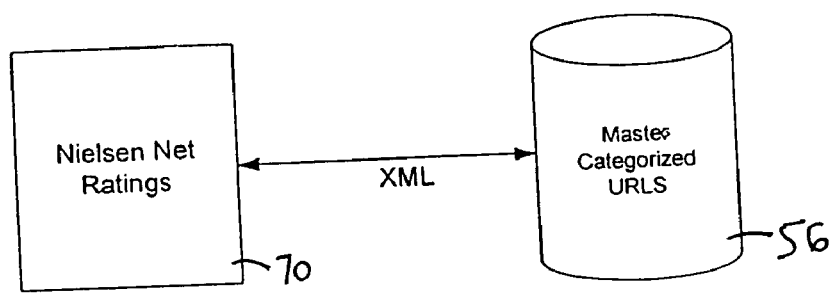
FIG. 11 is a block diagram illustrating the data transfer from a ratings service to the inventive system.

As previously discussed, in developing user profiles, the system uses data associating URL character strings selected by users on their client machines with a set of demographic and other information. Such data is available from, e.g., Neilsen NetRatings. The system preferably periodically queries a NetRatings or similar database 70 containing the data through XML to build a version of that database on the master server (the master categorized URL database 56) as shown in FIG. 11.

The master server synchronization component will periodically then replicate this database 56 on the local categorized URL database 32.

While in the system illustrated above, the advertising delivery channel is through an ISP, the system could be configured such that targeted advertisements are delivered through ordinary Web pages (using banner advertisements, etc.).

Also, in the system described above, Web site classification or profile data is obtained from third party vendors such as Neilsen NetRatings. However, this data may be alternatively generated by the system. By adding a number of users of known demographics, the system could be configured to generate the Web site profile data. Furthermore, the overall demographics generated for the other anonymous users in the system could be used to fill out gaps in the URL database, i.e., for Web sites having no classification data.

Having described preferred embodiments of the present invention, it should be apparent that modifications can be made without departing from the spirit and scope of the invention.

The invention claimed is:

1. A method of profiling a Web user, comprising:
   detecting, at an ISP (Internet service provider) server, an outgoing URL page request from a client;
   capturing, at the ISP server, the packets associated with the detected URL page request,
   extracting, from the packets captured at the ISP server, a Uniform Resource Locator (URL) identifying a network path to a Web site satisfying the URL page request;
   obtaining, at the ISP server, an IP (Internet protocol) address from a client;
   storing the extracted URL and the IP address obtain form the client in a database;
   correlating, at the ISP server, the IP address obtained from the client with a permanent anonymous user identifier using an IP address to anonymous user ID (AID) cross-reference table;
   associating the extracted URL with the permanent anonymous user identifier correlated with the IP address obtained from the client;
   for each permanent anonymous user identifier correlated with the IP address obtained from the client, storing the URL of the Web site satisfying the URL page request and the permanent anonymous user identifier correlated with the IP address obtained from the client;
   cross-referencing, at the ISP server, the extracted URL with demographic information in a categorized URL database profiling Web sites based on demographic characteristics of users accessing the profiled Web sites;
   extracting, at the ISP server, a set of the demographic information associated with the Web site cross-referenced to the extracted URL;
   extracting content affinity from a categorized listing of URLs that translate the extracted URL into a content preference for the profiled Web site associated with the extracted URL; and
   providing a user profile for the permanent anonymous user identifier based on the extracted URL and the extracted content affinity obtained by translating the extracted URL into the content preference for the profiled Web site associated with the extracted URL.

2. The method of claim 1, wherein the profile of the user contains data selected from demographic data.

3. The method of claim 2 wherein said demographic data is selected from the group consisting of user's age, user's gender, user's income and user's highest attained education level.

4. The method of claim 1, wherein the profile of the user contains psychographic data.

5. The method of claim 4 wherein said psychographic data includes data on the user's interests.

6. The method of claim 1, further comprising providing a database associating each of said plurality of Web sites with demographic characteristics of known persons who have accessed said sites.

7. The method of claim 6 wherein said database is provided by a Web site ratings service.

8. The method of claim 1, wherein the user profile comprises an update combined with an existing user profile.

9. The method of claim 8 wherein the generating a user profile comprises combining the profiles of the Web sites requested by a user identifier to the existing user profile using an averaging algorithm.

10. The method of claim 9 wherein said user profile includes data on a plurality of demographic categories, each associated with a rating, and the method further comprises filling in a value for the rating for any demographic category having a low confidence measure.

11. The method of claim 10 wherein filling in a value comprises using an average rating of persons having similar profiles to that of said user for a category having a low confidence measure.

12. The method of claim 11 wherein said average rating is determined using a clustering algorithm.

13. The method of claim 1 further comprising erasing records of which Web sites said user has visited after developing the user's profile to protect user privacy.

14. The method of claim 1, further comprising delivering selective advertising to the user identifier based on the user profile associated with the user identifier.

15. The method of claim 14 wherein delivering selective advertising comprises transmitting a pop-up advertisement to a display of a computer associated with a user identifier.

16. The method of claim 1, wherein the developing a user profile for user identifier further comprises generating, for a user associated a user identifier, a user profile having a rating for categories of Web sites of interest to the user and a confidence measure representing an estimate of accuracy of a category's rating.

17. A computer for profiling a Web user, comprising:
a memory for storing a program;
a processor operative with the program to detect, at an ISP (Internet service provider) server, an outgoing URL page request from a client, to capture, at the ISP server, the packets associated with the detected URL page request, to extract, from the packets captured at the ISP server, a Uniform Resource Locator (URL) identifying a network path to a Web site satisfying the URL page request, to obtain, at the ISP server, an IP (Internet protocol) address from a client, to store the extracted URL and the IP address obtain form the client in a database, to correlate, at the ISP server, the IP address obtained from the client with a permanent anonymous user identifier using an IP address to anonymous user ID (AID) cross-reference table, to associate the extracted URL with the permanent anonymous user identifier correlated with the IP address obtained from the client, for each permanent anonymous user identifier correlated with the IP address obtained from the client, to store the URL of the Web site satisfying the URL page request and the permanent anonymous user identifier correlated with the IP address obtained from the client, to cross-reference, at the ISP server, the extracted URL with demographic information in a categorized URL database profiling Web sites based on demographic characteristics of users accessing the profiled Web sites, to extract, at the ISP server, a set of the demographic information associated with the Web site cross-referenced to the extracted URL, to extract content affinity from a categorized listing of URLs that translate the extracted URL into a content preference for the profiled Web site associated with the extracted URL, and to provide a user profile for the permanent anonymous user identifier based on the extracted URL and the extracted content affinity obtained by translating the extracted URL into the content preference for the profiled Web site associated with the extracted URL.

18. The computer of claim 17, wherein the profile of the user contains data selected from demographic data.

19. The computer of claim 18 wherein the demographic data is selected from the group consisting of user's age, user's gender, user's income and user's highest attained education level.

20. The computer of claim 17, wherein the profile of the user contains psychographic data.

21. The computer of claim 20 wherein said psychographic data includes data on the user's interests.

22. The computer of claim 17, further comprising a database associating each of said plurality of Web sites with demographic characteristics of known persons who have accessed said sites.

23. The computer of claim 22 wherein said database is provided by a Web site ratings service.

24. The computer of claim 17, wherein the user profile of the user identifier comprises an existing user profile.

25. The computer of claim 24 wherein the processor generates a user profile by combining the profiles of the Web sites requested by a user identifier to the existing user profile using an averaging algorithm.

26. The computer of claim 25 wherein said user profile includes data on a plurality of demographic categories, each associated with a rating, and the processor fills in a value for the rating for any demographic category having a low confidence measure.

27. The computer of claim 26 wherein the processor fills in a value by using an average rating of persons having similar profiles to that of said user far a category having a low confidence measure.

28. The computer of claim 27 wherein said average rating is determined using a clustering algorithm.

29. The computer of claim 17, wherein the processor erases records of which Web sites said user has visited after developing the user's profile to protect user privacy.

30. The computer of claim 17, wherein the processor delivers selective advertising to the user identifier based on the user profile associated with the user identifier.

31. The computer of claim 30 wherein the processor delivers selective advertising by transmitting a pop-up advertisement to a display of a computer associated with a client having the user identifier.

32. A non-transitory computer readable medium comprising a program for profiling a Web user by performing the steps of:
detecting, at an ISP (Internet service provider) server, an outgoing URL page request from a client;
capturing, at the ISP server, the packets associated with the detected URL page request,
extracting, from the packets captured at the ISP server, a Uniform Resource Locator (URL) identifying a network path to a Web site satisfying the URL page request;
obtaining, at the ISP server, an IP (Internet protocol) address from a client;
storing the extracted URL and the IP address obtain form the client in a database;
correlating, at the ISP server, the IP address obtained from the client with a permanent anonymous user identifier using an IP address to anonymous user ID (AID) cross-reference table;
associating the extracted URL with the permanent anonymous user identifier correlated with the IP address obtained from the client;
for each permanent anonymous user identifier correlated with the IP address obtained from the client, storing the URL of the Web site satisfying the URL page request and the permanent anonymous user identifier correlated with the IP address obtained from the client;
cross-referencing, at the ISP server, the extracted URL with demographic information in a categorized URL database profiling Web sites based on demographic characteristics of users accessing the profiled Web sites;
extracting, at the ISP server, a set of the demographic information associated with the Web site cross-referenced to the extracted URL;
extracting content affinity from a categorized listing of URLs that translate the extracted URL into a content preference for the profiled Web site associated with the extracted URL; and
providing a user profile for the permanent anonymous user identifier based on the extracted URL and the extracted content affinity obtained by translating the extracted URL into the content preference for the profiled Web site associated with the extracted URL.

* * * * *

UNITED STATES PATENT AND TRADEMARK OFFICE
CERTIFICATE OF CORRECTION

PATENT NO. : 8,108,245 B1
APPLICATION NO. : 09/558755
DATED : January 31, 2012
INVENTOR(S) : Hosea et al.

It is certified that error appears in the above-identified patent and that said Letters Patent is hereby corrected as shown below:

Col. 11, line 62, claim 1: "address obtain form" should read --address obtained from--

Col. 13, line 16, claim 17: "address obtain form" should read --address obtained from--

Col. 14, line 8, claim 27: "user far a category" should read --user for a category--

Col. 14, line 34, claim 32: "address obtain form" should read --address obtained from--

Signed and Sealed this
Twentieth Day of November, 2012

David J. Kappos
*Director of the United States Patent and Trademark Office*